(12) United States Patent
Nakatani et al.

(10) Patent No.: US 8,479,064 B2
(45) Date of Patent: *Jul. 2, 2013

(54) SAFETY INPUT DEVICE

(75) Inventors: Hiroshi Nakatani, Tokyo (JP); Makoto Toko, Saitama-ken (JP); Eigo Fukai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 384 days.

This patent is subject to a terminal disclaimer.

(21) Appl. No.: 12/882,807

(22) Filed: Sep. 15, 2010

(65) Prior Publication Data

US 2011/0178612 A1 Jul. 21, 2011

(30) Foreign Application Priority Data

Jan. 18, 2010 (JP) ................................. 2010-008192

(51) Int. Cl.
*G01R 31/28* (2006.01)
*G05B 9/02* (2006.01)

(52) U.S. Cl.
USPC .............................. 714/724; 714/738; 700/81

(58) Field of Classification Search
USPC ............. 714/10–12, 21, 25, 30, 57, 701, 708, 714/724, 738, 742, 745; 700/79–81
See application file for complete search history.

(56) References Cited

U.S. PATENT DOCUMENTS

| | | | | |
|---|---|---|---|---|
| 4,520,482 A * | 5/1985 | Fourre et al. | ................. | 714/47.1 |
| 4,599,556 A * | 7/1986 | Lanz | ............... | 324/556 |
| 5,862,502 A * | 1/1999 | Giers | .............. | 701/71 |
| 6,393,582 B1 * | 5/2002 | Klecka et al. | .................. | 714/11 |
| 6,948,092 B2 * | 9/2005 | Kondo et al. | ................... | 714/12 |

FOREIGN PATENT DOCUMENTS

| | | |
|---|---|---|
| JP | 58-151734 | 9/1983 |
| JP | 3630583 | 12/2004 |
| JP | 2007-66246 | 3/2007 |
| JP | 4131134 | 6/2008 |

OTHER PUBLICATIONS

Agarwal, M.; Paul, B.C.; Ming Zhang; Mitra, S.; , "Circuit Failure Prediction and Its Application to Transistor Aging," VLSI Test Symposium, 2007. 25th IEEE , vol., no., pp. 277-286, May 6-10, 2007.*
Vazquez, J.C.; Champac, V.; Ziesemer, A.M.; Reis, R.; Teixeira, I.C.; Santos, M.B.; Teixeira, J.P.; , "Low-sensitivity to process variations aging sensor for automotive safety-critical applications," VLSI Test Symposium (VTS), 2010 28th , vol., no., pp. 238-243, Apr. 19-22, 2010.*
Japanese Office Action dated Mar. 22, 2013, in Japanese Patent Application No. 2010-008192 filed Jan. 18, 2010 (with English Translation).

* cited by examiner

*Primary Examiner* — Cynthia Britt
(74) *Attorney, Agent, or Firm* — Oblon, Spivak, McClelland, Maier & Neustadt, L.L.P.

(57) ABSTRACT

A safety input device includes an input controller to control transmission of an input signal to an arithmetic device, an output controller to instruct output of preset first self-diagnosis pattern data, a test pattern generating unit to encode the first self-diagnosis pattern data into a pulse train signal having a pulse width equal to or below a predetermined value and output the pulse train signal, a combination input unit to combine the pulse train signal with the input signal, an input interface unit, a pattern reconfiguration unit to decode an output signal from the combination input unit into second self-diagnosis pattern data, and a comparator to compare the first and second self-diagnosis pattern data to judge the presence or absence of a difference between the first and second self-diagnosis pattern data.

5 Claims, 3 Drawing Sheets

SAFETY INPUT DEVICE

CROSS REFERENCE TO RELATED APPLICATION

This application is based upon and claims the benefit of priority from the prior Japanese Patent Application No. 2010-8192, filed on Jan. 18, 2010, the entire contents of which are incorporated herein by reference.

BACKGROUND

1. Field

The invention relates to an input-output device of a control device that monitors and controls a plant or field equipment, or more specifically to a safety input device provided with a self-diagnosis function.

2. Description of the Background

A safety control system required to be highly reliable, particularly, is now equipped with a control apparatus that monitors and controls a plant, field equipment, and the like and that has a self-diagnosis function to self-diagnose a failure of the control apparatus without human help.

FIG. 5 shows a configuration example of such a safety control system. In FIG. 5, a safety control system 100 includes, for example, an input terminal portion 12, such as a sensor, that detects a state of a control target 200 such as a nuclear power plant or field equipment, a control apparatus 11 that receives an output from the input terminal portion 12 as an input signal and generates an output signal to control an operation terminal portion 13, such as valve, in accordance with a pre-stored control program, and the operation terminal portion 13.

The control apparatus 11 includes an input device 11b that receives a signal from the input terminal portion 12 as an input signal, an arithmetic device 11a that calculates an arithmetic output corresponding to the input signal, and an output device 11c that sends the arithmetic output to the operation terminal portion 13.

Incidentally, a device integrally having the input device 11b and the output device 11c is sometimes referred to as an input-output device or an I/O device, as well.

For example, recent safety equipment serving as the input terminal portion 12 and being connected to the control apparatus 11 such as a programmable logic controller (PLC) outputs a self-diagnosis pulse signal periodically for a self-diagnosis. The self-diagnosis pulse signal is an off signal which has an extremely short pulse width (e.g., 20 μsec). The safety equipment checks whether or not there is any anomaly in an output system by feeding the self-diagnosis pulse signal back to the safety equipment itself.

The PLC may erroneously take a self-diagnosis pulse signal as an operating signal into a main body in the PLC. In this context, Japanese Patent No. 4131134, for example, discloses a control apparatus capable of performing a stable sequence control even when being connected to an external device that outputs a self-diagnosis pulse signal, and also discloses an input circuit for the control apparatus and a signal input method for the control apparatus.

The input circuit according to Japanese Patent No. 4131134 sets an interval period which is known in advance as a period in which no self-diagnosis pulse signal is generated from the safety equipment, and separates an operation-output step signal from the self-diagnosis signal received from the external device, i.e., the safety equipment to take only the operation-output step signal into the main body of the control apparatus (PLC).

Meanwhile, Japanese Patent No. 3630583 discloses a method and an apparatus for online diagnosis of a fail-safe switch of safety equipment serving as the operating terminal portion 13.

In the meantime, Japanese Patent Application Publication No. 2007-66246 discloses a system and method for self-diagnosis of a controller including diagnosis execution means provided independently of a main processor in order to perform safety control and a highly accurate self-diagnosis at the same time as a safety control system.

In general, a self-diagnosis pulse signal, from a safety device, which is superimposed on signals from and to an input device and an output device of a control apparatus has a sufficiently smaller pulse width than those of normal input and output signals used for control so as to be distinguished from those normal input and output signals for control.

Incidentally, noise dependent on the installation environment of the control apparatus 11 interferes in an input line 100a connecting the input device 11b of the control apparatus 11 to the safety equipment such as the external input terminal portion 12, as well as in an output line 100b connecting the output device 11c of the control apparatus 11 to the safety equipment such as the external operating portion 13.

If the pulse width of a noise pulse caused by the noise and superimposed on signals on the input line 100a and the output line 100b is approximately equal to that of the self-diagnosis pulse signal, the self-diagnosis pulse signal cannot be distinguished from the noise pulse, causing a problem that a normal self-diagnosis cannot be performed.

As a countermeasure for the problem, the input device and the output device of a general safety control system are provided with noise filters on input terminals in order to remove the noise pulse having a pulse width equal to or smaller than that of the self-diagnosis pulse signal.

However, a noise removal method utilizing the frequency separation characteristics of the noise filter cannot completely separate foreign noise having wideband frequency components. Therefore, the method cannot distinguish unnecessary noise pulse signals from pulse signals which are generated due to a failure of the control target 200 or are generated as an indication of disconnection of any of the input line 100a and the output line 100b connecting the control apparatus 11 to the input terminal portion 12 and the operation terminal portion 13.

Accordingly, use of the noise filter may cause overlook of a pulse signal representing an indication of a failure, or false detection of a failure. Hence there is a problem that it is hard to detect errors of the input line 100a or the output line 100b.

Moreover, in the above-described method of Japanese Patent No. 4131134 which sets an interval period known in advance as a period in which no self-diagnosis pulse signal is generated from the safety equipment, and temporally separates the operation-output step signal from the self-diagnosis signal received from the external device, there is a problem that the safety control and the self-diagnosis of the input-output device cannot be executed in parallel or at any selected timing.

SUMMARY OF THE INVENTION

The invention has been made to solve the problems of conventional output devices of control devices. An object of the invention is to provide a safety input device of a control device, the safety input device having a self-diagnosis function and being capable of parallel execution of a self-diagnosis and safe control less susceptible to noise superimposed on signals on an input line connecting the input device to an input terminal portion such as a sensor.

To achieve the above object, the invention provides a safety input device of a control device, the safety input device being configured to send an input signal from an input terminal portion to an arithmetic device of the control device as input data and to execute a self-diagnosis of the safety input device, the safety input device comprising: an input controller configured to control conversion of the input signal into the input data and transmission of the input data to the arithmetic device synchronously with a control cycle set up by the arithmetic device; an output controller configured to make an instruction to output preset first self-diagnosis pattern data synchronously with the control cycle set by the arithmetic device; a test pattern generating unit configured to encode the first self-diagnosis pattern data sent from the output controller into a pulse train signal having a pulse width equal to or smaller than a predetermined pulse width and to output the pulse train signal in accordance with a baseband transmission system; a combination input unit configured to combine the pulse train signal with the input signal from the input terminal portion; an input interface unit configured to convert the input signal into a signal having an operating signal level of the safety input device and to send the signal to the input controller and the combination input unit at a timing instructed by the input controller; a pattern reconfiguration unit configured to reconfigure an output signal from the combination input unit as second self-diagnosis pattern data by decoding the output signal; and a comparator configured to compare the first self-diagnosis pattern data with the second self-diagnosis pattern data to judge the presence or absence of a difference between the first self-diagnosis pattern data and the second self-diagnosis pattern data. The presence or absence of a failure is judged based on the difference between the first self-diagnosis pattern data and the second self-diagnosis pattern data compared to each other, whereby the processing of the input data and the self-diagnosis are performed in parallel.

The invention can provide a safety input device of a control device, the safety input device having a self-diagnosis function and being capable of parallel execution of a self-diagnosis and safe control less susceptible to noises superimposed on signals on an input line connecting the input device to an input terminal portion such as a sensor.

DETAILED DESCRIPTION OF THE INVENTION

Embodiments of the invention will be described with reference to the drawings.

First Embodiment

A safety input device according to a first embodiment of the invention will be described with reference to FIGS. 1 and 2.

Figure 5:
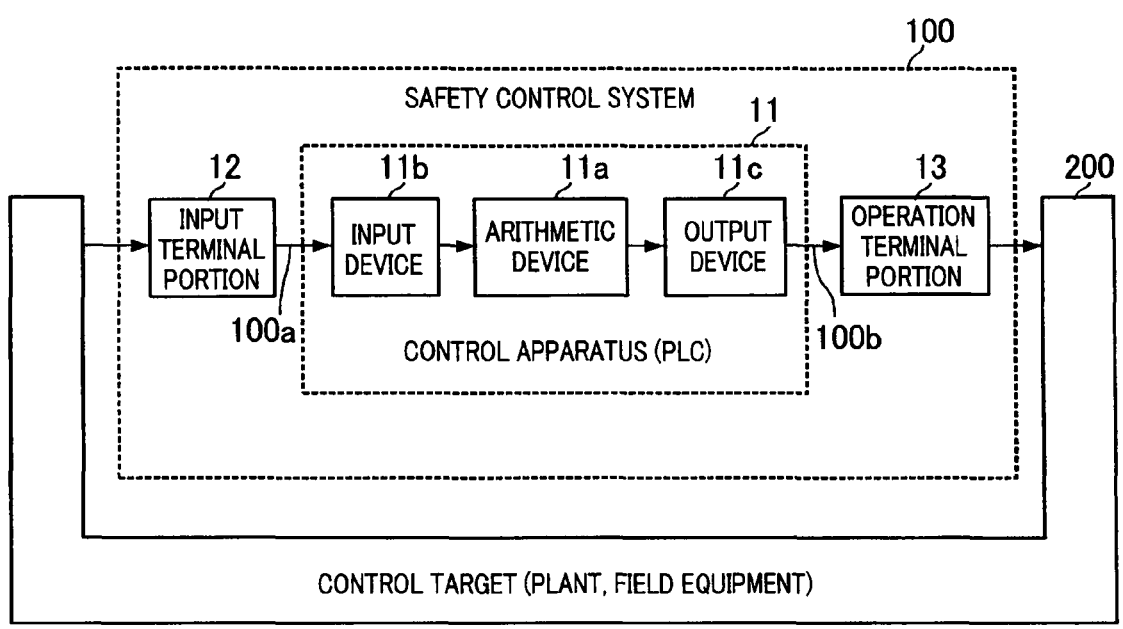
FIG. 5 is a configuration diagram of a safety control system.

Concerning a safety control system employing the safety input device, the same units as those of the configuration described in FIG. 5 will be designated by the same reference numerals, and description of those units will be omitted herein. To distinguish the safety input device of the invention from the conventional input device 11b described in FIG. 5, the safety input device of the invention will be hereinafter referred to as a safety output device 11b.

Figure 1:
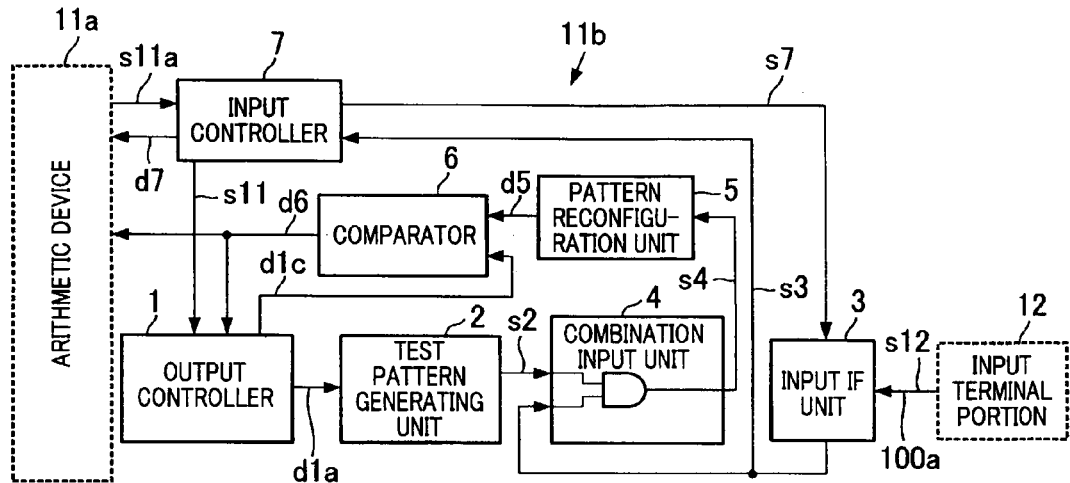
FIG. 1 is a configuration diagram of a safety input device according to a first embodiment of the invention.

In FIG. 1, the safety input device 11b of the invention is provided to a control device and is configured to convert an input signal sent from an input terminal portion 12, such as a sensor, into input data and to send the input data to an arithmetic device 11a. The safety input device 11b is also configured to perform a self-diagnosis.

The safety input device 11b includes an input controller 7, an output controller 1, a test pattern generating unit 2, and a combination input unit 4. The input controller 7 controls conversion of an input signal from the input terminal portion 12 into input data d7 and transmission of the input data d7 to the arithmetic device 11a synchronously with a control cycle set by the arithmetic device 11a. The output controller 1 instructs to output preset self-diagnosis pattern data d1a synchronously with the control cycle set by the arithmetic device 11a. The test pattern generating unit 2 encodes the self-diagnosis pattern data sent from the output controller 1 into a pulse train signal s2 having a pulse width equal to or smaller than a predetermined pulse width and outputs the pulse train signal s2 in accordance with a baseband transmission system. The combination input unit 4 combines the pulse train signal s2 with the input signal from the input terminal portion 12.

The safety output device 11c further includes an input interface unit 3, a pattern reconfiguration unit 5, and a comparator 6. The input interface unit 3 is provided with a low-pass filter to remove pulse noise being included in the input signal and having a pulse width equal to or smaller than that of the pulse train signal. The input interface unit 3 converts the input signal into a signal having an operating signal level of the input device 11b and sends the signal to the input controller 7 and to the combination input unit 4 at a timing instructed by the input controller 7. The pattern reconfiguration unit 5 decodes an output signal s4 from the combination input unit 4 to reconfigure the output signal s4 as self-diagnosis pattern data d5. The comparator 6 compares the self-diagnosis pattern data preset by the test pattern generating unit 2 with the decoded self-diagnosis pattern data d5 to judge the presence or absence of any difference between the data.

Next, detailed settings in the units will be described. The self-diagnosis pattern data d1b set by the output controller 1 and a setting change in the self-diagnosis pattern data d1b will be described below.

The self-diagnosis pattern data d1b are issued not as simple single pulses or multiple pulses of a fixed pattern, but as pulses of a data pattern different for each control cycle. Then, the test patter generating unit 2 converts the self-diagnosis pattern data d1b into the pulse train signal s3 in accordance with a coding system such as the baseband transmission system.

In this way, it is possible to reduce probability of accidental coincidence between the pulse train signal of the self-diagnosis pattern data d1a and a pulse signal attributable to foreign noise superimposed on an input line 100a connecting the safety input device 11b to the input terminal portion 12.

Moreover, although it is very unlikely to occur, there might be a case where the pulse pattern of the foreign noise temporally coincides, and thus interferes, with the pulse pattern of the self-diagnosis pattern data d1b.

In such a case, since the self-diagnosis pattern data d1a issued from the output controller 1 are different every time the self-diagnosis function is operated, the probability of accidental coincidence between the pulse pattern of the self-diagnosis pattern data d1a and the pulse pattern of the foreign noise can be reduced to a negligible level by carrying out a failure judgment based on results of multiple diagnostic sessions.

As a consequence, unlike the conventional configuration that uses a noise filter to remove a pulse signal attributable to foreign noise, it is possible improve reliability of the failure diagnostic function, of the safety input device 11b, capable of detecting a failure or an indication of a failure.

Next, a setting of the pulse train signal of the test pattern generating unit 2 will be described. Among noise pulses induced to the input line 100a and superimposed on the input signal, those in high frequency are removed by the low-pass filter provided to the input interface unit 3.

Then, the pulse width of the encoded pulse train signal s2 generated by the test pattern generating unit 2 is set small so that the encoded pulse train signal s2 may have a higher frequency than the input signal component which passes the low-pass filter of the input interface unit 3, for example.

Such configuration facilitates filter removal of noise in the units and thereby avoids an influence on the self-diagnosis with the pulse train signal. Accordingly, even if any of the units of the safety input device 11b is affected by foreign noise, safe data can be sent to the arithmetic device 11a.

Next, operations of the safety input device 11b thus configured will be described with reference to FIG. 2. FIG. 2 is a timing chart illustrating data output timings and input-output signals of the units of the safety input device 11b.

First, the input controller 7 of the safety input device 11b receives a signal s11a synchronized with a control cycle signal from the arithmetic device 11a, and sends a test instruction signal s11 synchronized with the signal s11a to the output controller 1 and an input-signal read instruction signal s7 to the input interface unit 3.

Figure 2:
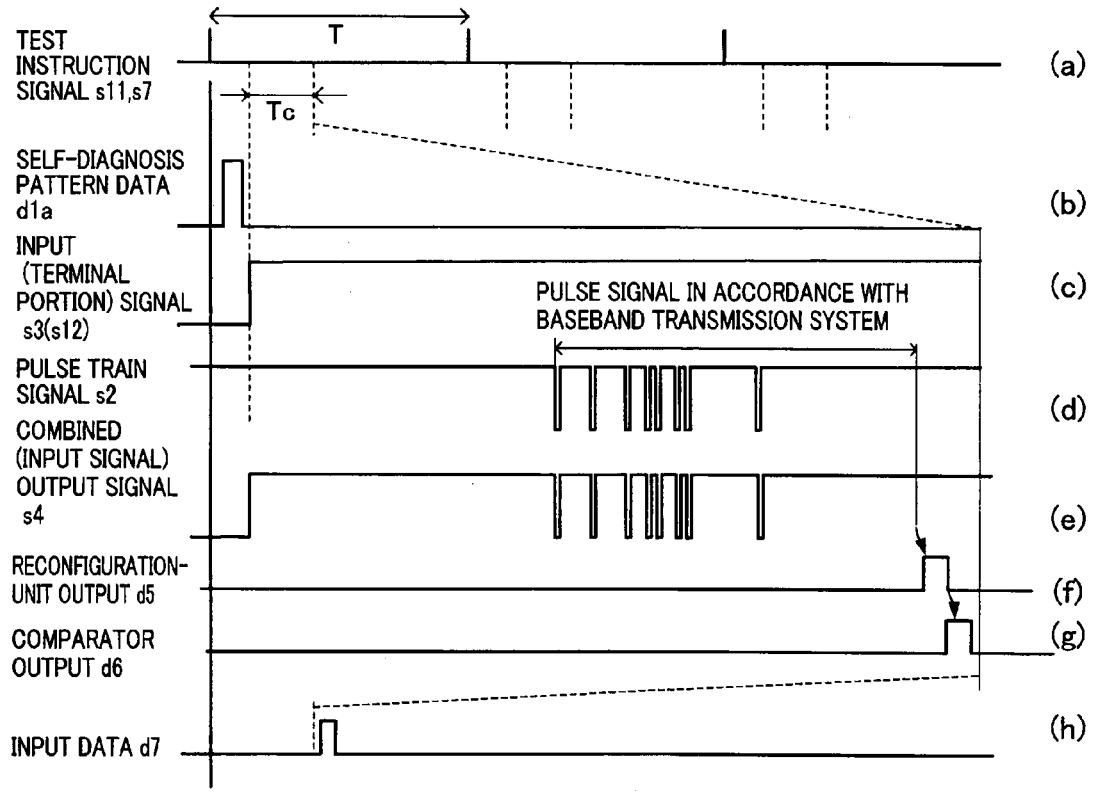
FIG. 2 is a timing chart illustrating operations in the first embodiment of the invention.

Upon receipt of the test instruction signal s11 shown in (a) in FIG. 2 from the input controller 7, the output controller 1 sends the self-diagnosis pattern data d1a to the test pattern generating unit 2 at a timing shown in (b) in FIG. 2.

Then, as shown in (c) in FIG. 2, the input interface unit 3 converts an input-terminal-portion signal s12 into an input signal s3 having a digital circuit logic level and sends the input signal s3 to one of input terminals of the combination input unit 4.

Incidentally, the input signal s3 is a signal also referred to as a normal DI input and is one-bit state change signal or is configured with multiple-bit data. (c) in FIG. 2 represents a timing of the one-bit state change in the input signal s3. Meanwhile, the definitions of signal logics of activeness and inactiveness may be changed as appropriate so as to deal with any cases.

Meanwhile, as shown in (d) in FIG. 2, the test pattern generating unit 2 converts the sent self-diagnosis pattern data d1a into the pulse train signal s2 and sends the pulse train signal s2 to the other input terminal of the combination input unit 4 in accordance with the baseband transmission system.

As shown in (e) in FIG. 2, the combination input unit 4 calculates a logical product of the input signal s3 and the pulse train signal s2 and outputs a combined output signal s4 thus combined.

As shown in (f) in FIG. 2, the pattern reconfiguration unit 5 decodes the combined output signal s4 and sends the decoded self-diagnosis pattern data d5 to the comparator 6.

The comparator 6 receives diagnosis comparison control data d1c from the output controller 1. The diagnosis comparison control data d1c contains the self-diagnosis pattern data d1a instructed by the output controller 1. Then, the comparator 6 compares the preset self-diagnosis pattern data d1a with the decoded self-diagnosis pattern data d5 to judge the presence or absence of any difference between the data d1a and d5, and sends a result of the judgment as comparator output data d6 to the arithmetic device 11a and the output controller 1 at a timing shown in (g) in FIG. 2.

When the self-diagnostic processing is completed, the input controller 7 converts the input signal s12 into the input data d7 and sends the input data d7 and the comparator output data d6 to the arithmetic device 11a.

The timing to judge the presence or absence of an anomaly by means of data comparison between the preset self-diagnosis pattern data d1a and the decoded self-diagnosis pattern data is set so that processing up to the judgment may be executed within a specific diagnostic period Tc in the control cycle T controlled by the arithmetic device 11a and that the take-in of the input data and the self-diagnosis may be performed in parallel.

The safety input device has been described based on the example in which the input-terminal-portion signal is a digital output signal. However, the safety input device can be adapted easily for a case where the input-terminal-portion signal is an analog signal, by providing the input interface unit 3 with an analog digital converter (ADC) to convert the analog signal into a digital signal and then sending the digital signal to the combination input unit 4.

As described above, according to the invention, safe self-diagnosis can be executed even when foreign noise induced from the input line and the like is superimposed on the input signal.

Moreover, the self-diagnosis can be executed without interrupting, namely in parallel with, transmission of the input data to the arithmetic device. Accordingly, the self-diagnosis can be executed constantly to allow prevention of an oversight of a failure.

Second Embodiment

Figure 3:
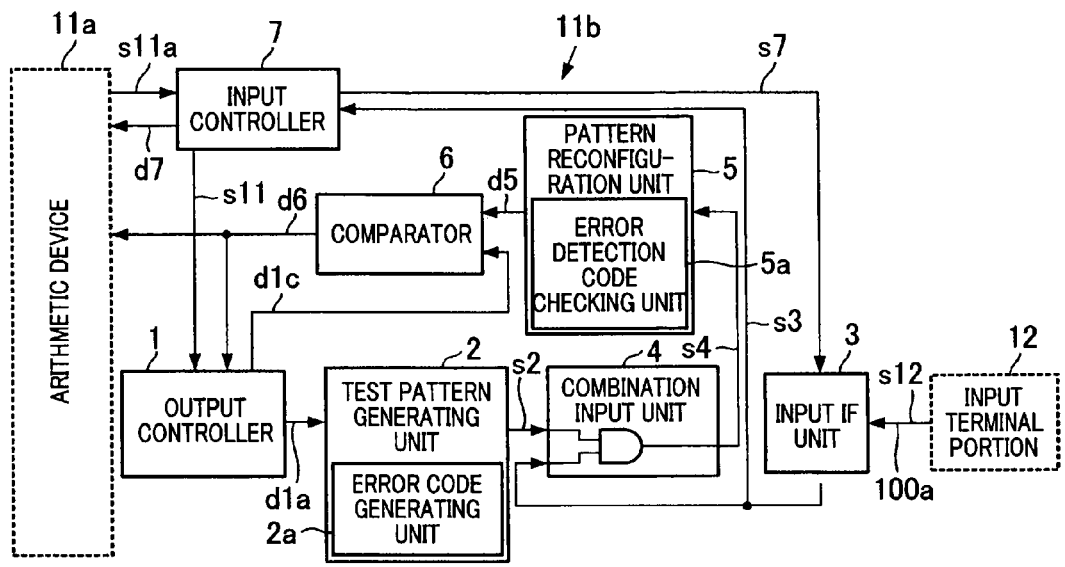
FIG. 3 is a configuration diagram of a safety input device according to a second embodiment of the invention.

Next, a safety input device 11b according to a second embodiment will be described with reference to FIG. 3. Portions in the second embodiment which are the same as those shown in FIG. 1 will be designated by the same reference numerals, and description of those portions will be omitted.

The second embodiment is different from the first embodiment in the following respects. Specifically, in the first embodiment, the test pattern generating unit 2 generates only the self-diagnosis pattern data. In contrast, in the second embodiment, the test pattern generating unit 2 is provided with an error code generating unit 2a to attach an error detection code to the self-diagnosis pattern data. Moreover, the pattern reconfiguration unit 5 is provided with an error detection code checking unit 5a configured to check the error detection code thus attached.

Moreover, the second embodiment is also different in that the comparator 6 is configured to compare the preset self-diagnosis pattern data with the self-diagnosis pattern data decoded and obtained by excluding the code, to judge the presence or absence of any difference.

Now, details of the second embodiment will be described below focusing on differences from the first embodiment. The test pattern generating unit 2 of the second embodiment sends the self-diagnosis pattern data d1a received from the output controller 1 to the error code generating unit 2a where, before the self-diagnosis pattern data d1a is converted into the pulse train signal, an error detection code for detecting a data error is calculated using the received self-diagnosis pattern data d1a.

A function such as cyclic redundancy check (CRC) is used as the error detection code, for example. The error code generating unit 2a generates self-diagnosis pattern data with code by attaching the calculated error detection code data having a fixed length to the end of the self-diagnosis pattern data d1a. The test pattern generating unit 2 converts the self-diagnosis pattern data with code into the pulse train signal s2 by an encoding method such as the baseband transmission system, and sends the pulse train signal s3 to one of input terminals of the combination output unit 4.

Then, the combination input unit 4 calculates a logical product of the pulse train signal s2 and the input signal s3 sent to the other input terminal of the combination input unit 4.

Meanwhile, the pattern reconfiguration unit 5 decodes the output signal s4 into the self-diagnosis pattern data with code in accordance with a signal decoding procedure inverse to that performed by the test pattern generating unit 2, by using, for example, the baseband demodulation system.

Then, the error code checking unit 5a executes an error check of the self-diagnosis pattern data with code obtained by decoding using the same cyclic redundancy check as that generated by the error code generating unit 2a. Then, the pattern reconfiguration unit a sends the comparator 6 a result of the error check by the error code checking unit 5a and the self-diagnosis pattern data d5 obtained by excluding the error detection code.

The comparator 6 compares the decoded self-diagnosis pattern data, with the preset self-diagnosis pattern data to judge the presence or absence of any difference between the decoded self-diagnosis pattern data and the preset self-diagnosis pattern data, and then sends the arithmetic device 11a and the output controller 1 a result indicating whether the safety input device 11b has a failure or not.

If the result of the error check by the pattern reconfiguration unit 5 turns out to be an "error," the result can also indicate a possible failure of the safety input device 11b. For this reason, the comparator 6 may be omitted from the configuration. However, it is also possible to combine the error judgment by the pattern reconfiguration unit 5 with the comparison diagnosis by the comparator 6.

Alternatively, the error code generating unit 2a may be configured to generate the self-diagnosis pattern data with code by attaching an error detection correcting code to the self-diagnosis pattern data and to output the self-diagnosis pattern data with code as a pulse train signal in accordance with the baseband transmission system.

What is usable as the error detection correcting code is an extended Hamming code capable of being processed at high speed and of simultaneously performing error correction of one bit and error detection of up to one bit.

According to the second embodiment configured as described above, it is possible to detect an anomaly of the data between the output controller 1 and the comparator 6 by using the self-diagnosis pattern data with code, and to thus detect an anomaly of the data to be outputted from the combination output unit 4 to the operation terminal portion 13.

Moreover, it is possible to further improve reliability of the failure diagnostic function of the safety input device by combining the error code check with the comparison diagnosis between the self-diagnosis pattern data and the read-back self-diagnosis pattern data.

Third Embodiment

Figure 4:
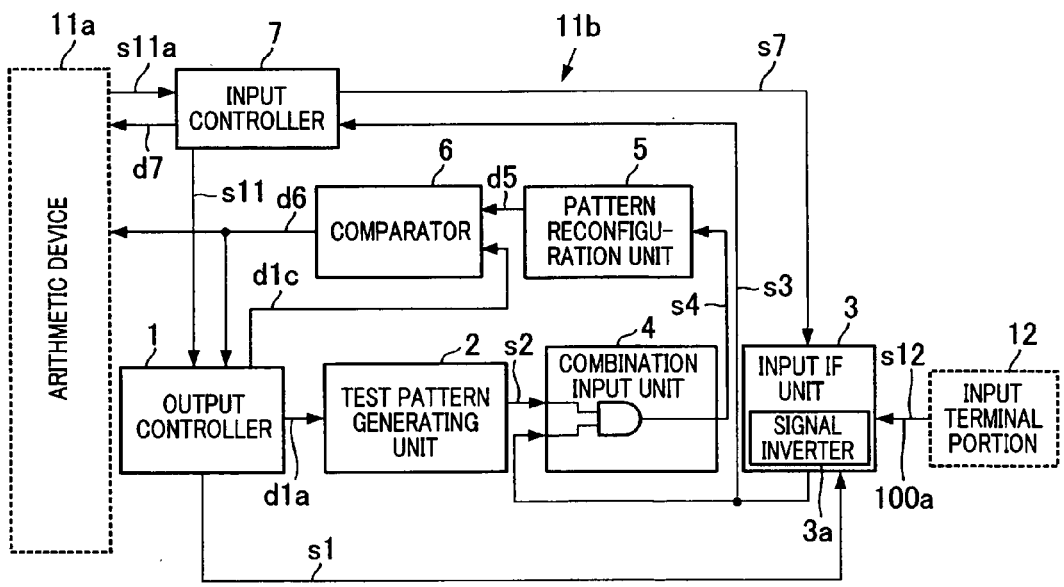
FIG. 4 is a configuration diagram of a safety input device according to a third embodiment of the invention.

Next, a safety output device according to a third embodiment will be described with reference to FIG. 4. Portions in the third embodiment which are the same as the portions shown in FIG. 1 will be designated by the same reference numerals, and description of those portions will be omitted.

The third embodiment is different from the first embodiment in the following respects. Specifically, the input interface unit 3 includes a signal inverter 3a that inverts the input signal s3 when the output controller 1 does not instruct output of the self-diagnosis pattern data. Meanwhile, the comparator 6 is configured to make a comparison using the inverted data while considering a timing of an input inversion instruction signal s1 for the input signal, instructed by the output controller.

Specifically, the diagnosis using the self-diagnosis pattern data according to the configuration of the first embodiment has a problem when the signal cannot be outputted at the 0 V potential due to disconnection of a ground signal line of the input line 100a or when the signal level of the input signal is recognized based on the input signal inputted to the combination input unit 4 and the pattern reconfiguration unit 5 due to a failure of the input interface unit 3. In any of the above-mentioned cases, it is not possible to detect a failure until this signal level becomes 0 V.

On the other hand, according to the third embodiment, it is possible to change the logic of the input signal inputted to the input interface unit 3 under a situation where the input signal does not change. Hence it is possible to detect the error signal of the safety input device as described above.

Moreover, according to the third embodiment, it is possible to further improve reliability of the self-diagnosis of the safety input device by adding the function of the third embodiment without changing the cycle of execution of the diagnosis using the self-diagnosis data pattern.

It is to be understood that the invention shall not be limited to the above-described embodiments and that the self-diagnosis pattern data, the error code, the error detection correcting code, and the like can be modified into various optimum forms according to requirements, such as reliability and diagnostic time, of safety systems without departing from the scope of the present invention.

While various embodiments of the invention have been described above, these embodiments are described purely by way of example and are not intended to restrict the scope of the invention.

In fact, the novel devices described herein could be embodied in various other modes and, furthermore, without departing from the gist or spirit of the present invention, various omissions, substitutions and alternations could of course be effected in the mode of the devices described herein.

What is claimed is:

1. A safety input device of a control device, the safety input device being configured to send an input signal from an input terminal portion to an arithmetic device of the control device as input data and to execute a self-diagnosis of the safety input device, the safety input device comprising:
    an input controller configured to control conversion of the input signal into the input data and transmission of the input data to the arithmetic device synchronously with a control cycle set up by the arithmetic device;
    an output controller configured to make an instruction to output preset first self-diagnosis pattern data synchronously with the control cycle set by the arithmetic device;
    a test pattern generating unit configured to encode the first self-diagnosis pattern data sent from the output controller into a pulse train signal having a pulse width equal to or smaller than a predetermined pulse width and to output the pulse train signal in accordance with a baseband transmission system;

a combination input unit configured to combine the pulse train signal with the input signal from the input terminal portion;

an input interface unit configured to convert the input signal into a signal having an operating signal level of the safety input device and to send the signal to the input controller and the combination input unit at a timing instructed by the input controller;

a pattern reconfiguration unit configured to reconfigure an output signal from the combination input unit as second self-diagnosis pattern data by decoding the output signal; and a comparator configured to compare the first self-diagnosis pattern data with the second self-diagnosis pattern data to judge the presence or absence of a difference between the first self-diagnosis pattern data and the second self-diagnosis pattern data, wherein the presence or absence of a failure is judged based on the difference between the first self-diagnosis pattern data and the second self-diagnosis pattern data compared to each other, whereby the processing of the input data and the self-diagnosis are performed in parallel.

2. The safety input device according to claim 1, wherein the test pattern generating unit further comprises an error code generating unit configured to generate self-diagnosis pattern data with code by attaching an error detection code to the first self-diagnosis pattern data and to output the self-diagnosis pattern data with code encoded as a pulse train signal in accordance with a baseband transmission system, the pattern reconfiguration unit comprises an error detection code checking unit configured to decode the output signal from the combination input unit in accordance with a baseband demodulation system, to perform an error code check by using the error detection code attached to the decoded data, and to send the comparator any one of a result of the error code check and the second self-diagnosis pattern obtained by excluding the error detection code from the decoded data, and the comparator detects a failure by using the result of the check or by comparing the first self-diagnosis pattern data with the second self-diagnosis pattern data to judge the presence or absence of a difference between the first self-diagnosis pattern data and the second self-diagnosis pattern data.

3. The safety input device according to claim 1, wherein the test pattern generating unit further comprises an error code generating unit configured to generate self-diagnosis pattern data with code by attaching an error detection correcting code to the first self-diagnosis pattern data and to output the self-diagnosis pattern data with code encoded as a pulse train signal in accordance with a baseband transmission system, the pattern reconfiguration unit comprises an error detection code checking unit configured to decode the output signal from the combination input unit in accordance with a baseband demodulation system, to perform an error code check by using the error detection code attached to the decoded data, and to send the comparator any one of a result of the error code check and the second self-diagnosis pattern obtained by excluding the error detection code from the decoded data, and the comparator detects a failure by using the result of the check or by comparing the first self-diagnosis pattern data with the second self-diagnosis pattern data to judge the presence or absence of a difference between the first self-diagnosis pattern data and the second self-diagnosis pattern data.

4. The safety input device according to claim 3, wherein the error detection correcting code is an extended Hamming code.

5. The safety input device according to claim 1, wherein the input interface unit further comprises a signal inverter configured to invert the input signal from the input terminal portion, the input signal is inverted when the output controller makes no instruction to output the first self-diagnosis pattern data, and the comparator judges the presence or absence of a failure based on comparison between an inverted pattern instructed from the output controller and reconfigured data sent from the pattern reconfiguration unit.

* * * * *